April 24, 1934.　　G. R. BLAKESLEY　　1,956,267
HEATING ELEMENT ASSEMBLY
Filed July 21, 1932　　2 Sheets-Sheet 1
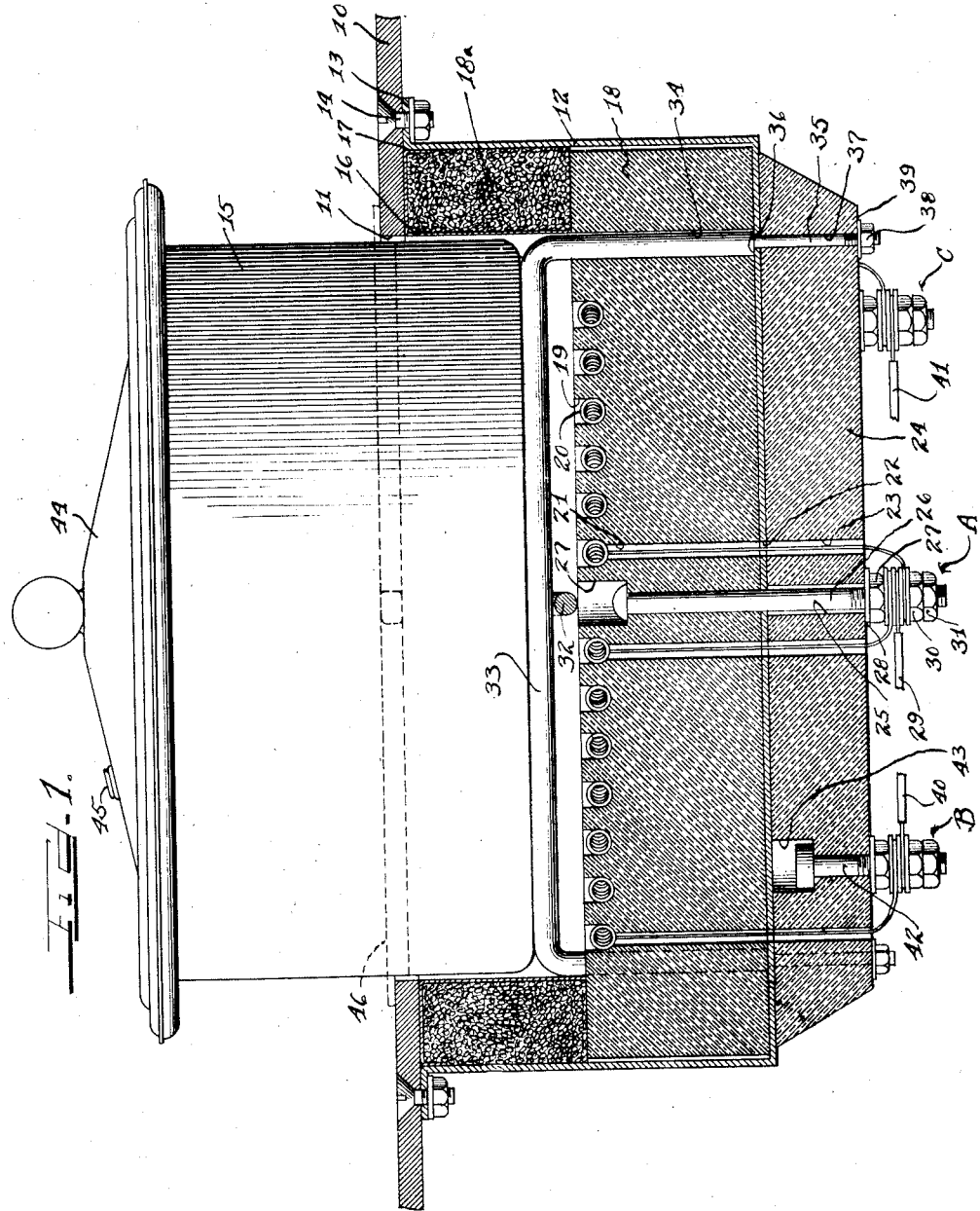
Inventor
George R. Blakesley.
by Charles O'Mills Attys.

April 24, 1934.  G. R. BLAKESLEY  1,956,267
HEATING ELEMENT ASSEMBLY
Filed July 21, 1932  2 Sheets-Sheet 2
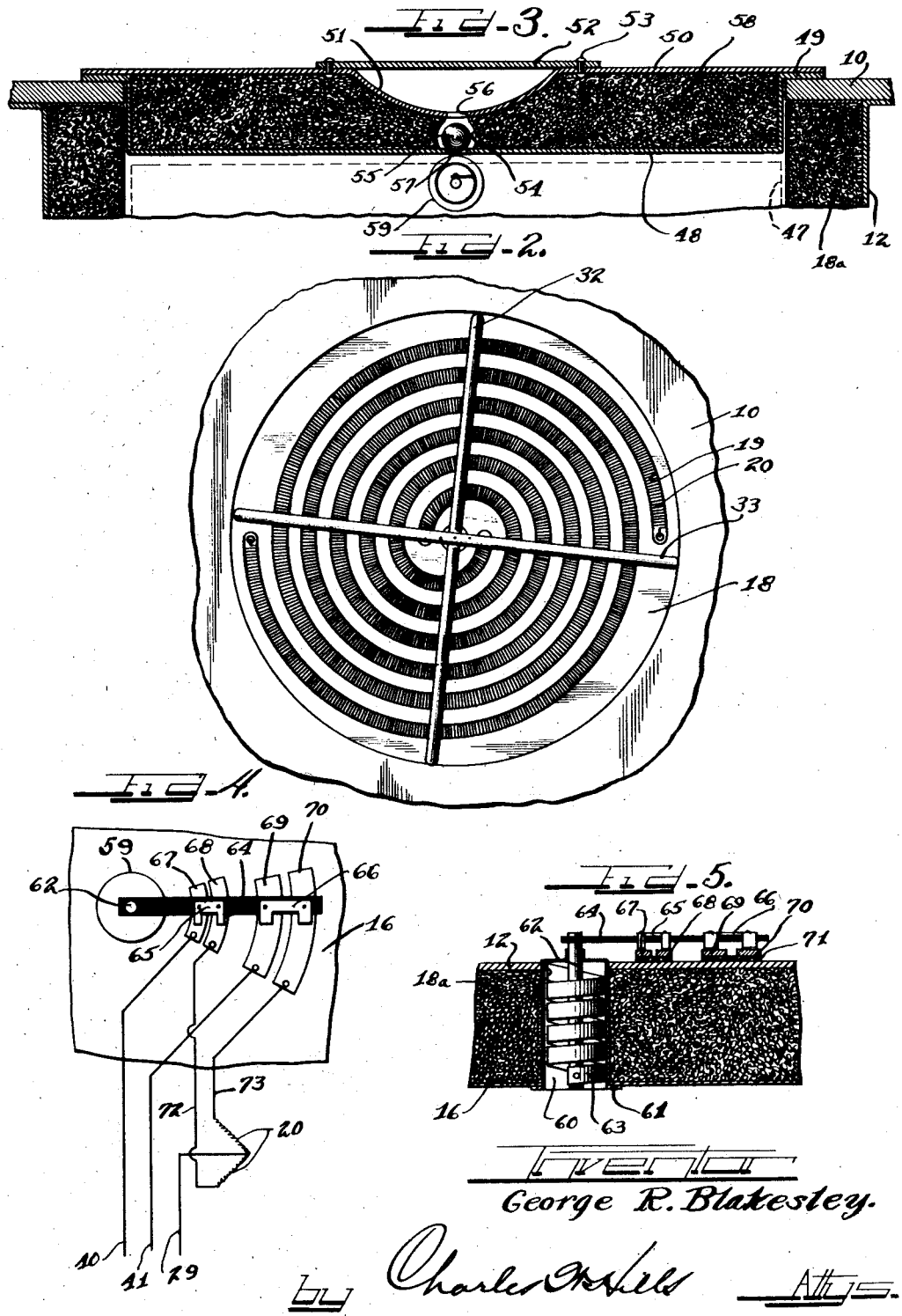
George R. Blakesley.

Patented Apr. 24, 1934

1,956,267

UNITED STATES PATENT OFFICE 1,956,267

HEATING ELEMENT ASSEMBLY

George R. Blakesley, Joplin, Mo.

Application July 21, 1932, Serial No. 623,782

5 Claims. (Cl. 219—37)

This invention relates in general to improvements in heating element assemblies such as are used in connection with electric stoves and the like, and has for its primary object the provision of a heating element assembly in which the various elements are so constructed and relatively placed as to result in increased efficiency of operation, whereby the heating element heats up more rapidly and less heat energy is wasted through conduction between the parts and through radiation.

One of the primary disadvantages of the surface heating unit as embraced in the present types of electric ranges resides in the low efficiency of the heating unit. Although the efficiency of these units in laboratory tests has been found to be relatively low, the units in actual practice have been found to be much lower than the laboratory tests indicated, as the result of the method of operating the units.

In the usual type of unit the heating element is supported upon some material such as lava brick, which must necessarily have a relatively high density in order that it may possess sufficient strength to withstand the weight of cooking utensils placed upon it. This relatively high density causes a considerable amount of the generated heat to be absorbed. It is therefore apparent that a large amount of this stored up heat energy is lost due to the fact that during the cooking operation, advantage is not taken of the stored up heat energy, and the heating element may be energized continuously.

A large portion of the heat energy is also lost by radiation and conduction. Tests have shown that the temperature, of even well insulated electric heating units, is relatively high on the bottom of the unit. Due to the fact that the units are usually supported by heavy iron members, considerable heat is conducted away from the units and does not reach the cooking utensils. Also, a large amount of heat is conducted along the surface of the cooking table of the stove.

Having in mind the disadvantages of the usual types of heating element assemblies, this invention contemplates the construction of a heating element assembly wherein the major portion of the generated heat energy will be utilized before it has had an opportunity to escape or be wasted.

The invention has for a further object the provision of a heating element assembly wherein the heat energy will be concentrated at the point where it is desired to use the same for cooking purposes, and not lost through conduction and radiation into undesirable channels where it will not be available for the purpose desired.

It is a further object of the invention to provide a heating element assembly of an improved type, wherein the heating element is mounted in an insulated well having low heat absorbing characteristics, whereby the loss of heat energy through radiation and conduction is reduced to a minimum and the heat energy is applied to the cooking utensils with greater efficiency.

A further object of the invention is to provide a well type heating element assembly of such construction and design as to enable it to be advantageously incorporated in either a deep well unit or a shallow well unit.

It is a further object to provide a deep well heating element assembly of such construction and design as to enable the cooking of foods under pressure without having to resort to the use of especially constructed cooking utensils, the heating element assembly at the same time being readily adapted, if desired, for use in the ordinary manner with but a slight decrease in efficiency, this efficiency, however, being materially greater than the ordinary type of surface heater.

Another object of the present invention is to provide a heating element assembly which is adapted for the cooking of foods under pressure, and which is so constructed that the temperature during the cooking operation may be controlled by thermostatic means.

It is also an object of the present invention to provide improved terminals for the heating element, these terminals being so arranged that they are removed from the heating zone, and so constructed that they will not heat up at the points where electrical connections are made thereto.

In accordance with the general features of this invention, it is proposed to provide a container having an insulated lining, this insulation being of such material as to have low heat absorbing characteristics. The heating element is supported on this lining and a rack is provided above the heating element for supporting the cooking utensil over the element without subjecting the element to the weight of the cooking utensil. The terminals are supported in a terminal block outside the above mentioned container. This construction is advantageous in that it supports the terminals outside of the heat zone. As an added feature of construction, the terminals are composed of parts having relative large surface exposure, thus tending to keep the terminals cool and prevent their heating up at the points where electrical connections are made thereto.

Other objects and features of this invention will more fully appear from the following detail description taken in connection with the accompanying drawings which illustrate a single embodiment thereof, and in which Figure 1 is an enlarged vertical section through the cooking table top and heating element assembly embodying the features of this invention;

Figure 2 is a fragmentary plan view of a cooking table top with a heating element assembly such as described herein;

Figure 3 is a vertical section showing a modified arrangement comprising a deep well structure and cover cooperating with the well and table top to form a pressure cooking compartment;

Figure 4 is an elevation of the interior wall of the well structure, showing thermostatic means and circuit connections for controlling the heating element; and Figure 5 is an enlarged fragmentary sectional view through the wall structure of the well and the thermostatic means for controlling the heating element.

As shown on the drawings:

The illustrated embodiment of my invention, as shown in Figure 1, embraces a top 10 of a cooking table which is of the usual construction and which forms a part of an electric stove, range, or other cooking appliance. The cooking table is provided with the usual openings as shown at 11 at each heating element.

In axial alignment with the opening 11 is a container or pan 12 having its rim portion formed into an outwardly deflected flange 13 which is apertured at spaced intervals for receiving bolts 14 by means of which the pan or container is secured in depending position to the underside of the cooking table top 10. This pan is preferably constructed of heavy metal so as to have sufficient strength for supporting the heating element assembly and the cooking utensil 15. The pan is preferably constructed to have an outside diameter greater than the diameter of the opening 11 in order to enable the insertion of an upper inner lining 16 which is inwardly spaced from the side wall of the pan. The inner lining 16 is of such diameter as to have its inner surface in the same plane as the inner surface of the opening 11 and the upper end of this lining is outwardly deflected and provided with a right angle flange at its outer end as shown at 17 to form abutment surfaces for engaging the under surface of the cooking table top and the inner surface of the pan wall.

For supporting the lining 16, there is provided a relatively thick block 18 of insulating material having high heat resisting and low heat absorption characteristics. For this purpose I have found molded rock wool to be admirably suited. This block extends over the entire bottom of the pan and is of such diameter as to fit snugly within the pan.

The annular space above the block 18 and lying between the outer wall of the container and the inner lining 16 is filled with an insulating packing 18a such as rock wool, mineral wool or the like having low heat absorbing characteristics.

It is not necessary that the inner lining 16 should be constructed of material which is as heavy as that utilized in the pan or container 12. It has been found however that a very desirable construction is attained by the use of thin aluminum which will have little tendency to store up or absorb heat energy. The efficiency of the heating element assembly is increased if the inner surface of the inner lining 16 is polished, this polished surface tending to reflect the heat away from the lining rather than permit the lining to absorb the heat.

The upper surface of the block 18 is provided with conventional grooves 19, which in this instance are shown as being spiral in shape, within which is disposed a coiled heating element 20 of the usual construction.

The heating element may comprise a single continuous coil, however, it is preferred to have the heating unit constructed of several coils, two in this instance, thereby enabling several different heats to be obtained. The inner ends of the two heating elements are carried through suitable apertures 21 in the block 18, apertures 22 in the bottom of the container and apertures 23 in a terminal block 24, these apertures being in axial alignment. These inner ends are connected to a common terminal generally indicated at A which will be described subsequently in detail. The outer ends of the heating elements are respectively connected to individual terminals in the same manner which are generally indicated at B and C.

The terminal block 24 is also of a material having electric insulating characteristics, such as lava or porcelain. This block is centrally passaged as indicated at 25 for receiving a terminal bolt 26 which extends through the block 18 and has its head disposed in a recessed portion 27 therein. The terminal block is tightly held against the bottom of the pan 12 by means of a nut 27 which is threaded on the bolt and tightened against a washer 28 between the nut and the block 24. The inner ends of the heating elements and a line connection 29 are disposed between a plurality of washers and tightly secured by means of a nut 30 which cooperates with the nut 27 to compress the washers and connection leads into tight engagement. Loosening of the nut 30 is prevented by a lock nut 31 which is also threaded onto the bolt 26.

The outer periphery of the block 24 is held against the bottom of the pan 12 by the fastening means for a utensil supporting rack which is disposed in such a manner as to support the utensil above the heating element and prevent injury thereto. This rack, as shown in Figures 1 and 2, comprises a pair of right angularly disposed rods 32 and 33 which are supported in like manner. Each rod is downwardly deflected at its ends, these deflected ends being disposed respectively in a suitable passage 34 in the block 18. Each end is contracted as shown at 35, this contracted portion forming an abutment shoulder 36 which engages the upper surface of the bottom of the pan. The contracted portion 35 extends through a suitable aperture in the bottom of the pan and also a passageway 37 in the block 24. The outer end of the contracted portion is threaded for receiving a nut 38 and washer 39 which cooperate when the nut is tightened to hold the outer margin of the block 24 against the bottom of the pan. This arrangement also firmly supports the rods 32 and 33 in operative position.

The terminals B and C which are respectively used for connecting the line wires 40 and 41 to the outer ends of the heating elements are similarly constructed to the terminal A to which the line wire 29 and inner ends of the heating elements are connected. In the case of the terminals B and C, however, the terminal bolt 42 only extends through the terminal block, the head of this bolt being disposed in a recessed portion 43 of the block. With the foregoing arrangement of terminals, it will be observed that the terminals are firmly supported outside of the heat zone and are shielded by the terminal block 24 and the block 18 so that the terminals are not directly exposed to the heat emanating from the heating elements. It will also be observed that the nuts, washers and other cooperative parts of the terminals are sufficiently large to have considerable exposed surface, whereby the terminals are kept cool and will not heat up at the points where the lead wires are connected thereto.

The above described construction provides an insulated well having the heating element disposed below the top of the cooking table. Referring to Figure 1, it is contemplated that the cooking utensil 15 will be inserted through the opening 11 in the top of the cooking table and be supported upon the rack members 32 and 33. In the present instance, the cooking utensil 15 is disclosed as embracing a utensil adapted for cooking foods under pressure. The main container is provided with a tight fitting cover 44 having a relief valve 45 to prevent the pressure within the utensil from reaching a dangerous value. The construction embodied in the heating unit assembly of my invention is adapted for use with equal facility for either a shallow type or deep type of well. If desired, when using the shallow well type assembly, the cooking utensil need not be inserted in the well as shown in Figure 1, but may be supported upon a grill structure indicated at 46 in dotted lines. The grill structure is of the usual construction and is adapted to fit into the opening 11 in the cooking table top. Although the cooking operation will not be dispatched with quite the efficiency as in the case where the utensil is inserted in the well, still the efficiency will be considerably above that of the ordinary type of surface heater.

In Figure 3, a slightly modified use of the well type heating unit assembly of my invention is shown. In this case it is intended that instead of using the pressure cooking utensil as disclosed in Figure 1, an ordinary pan type utensil may be inserted in the well, this utensil being designated by dotted lines as shown at 47. Of course, it will be readily apparent that in the deep well construction, the inner lining 16 and the container or pan 12 will be deeper than in the shallow well type. In the deep well arrangement, a cover is provided of such size as to fit into the opening 11 in the cooking table top and extend into the well and overlap the inner lining 16.

This cover embraces a pan shaped member 48 having an annular outwardly extending flange 49 for extending over the upper surface of the cooking table top. Extending over the pan member and secured to the flange 49 in any appropriate manner as by welding is a top member 50. The top member 50 is depressed at its central portion as shown at 51, this depressed portion being bridged by a handle member 52 which is secured at its ends as by rivets 53 to the top member. A central passageway 54 is provided centrally of the cover wherein there is disposed a ball 55 which is retained within the passage by letting the top and bottom of the pan portion extend over the ends of the passageway 54. The top and bottom of the pan at the passageway 54 are respectively apertured as shown at 56 and 57, the latter aperture defining a seat for the ball 55. With this arrangement, it will be apparent that the ball will normally close the aperture 57 and when sufficient pressure is accumulated within the well, the ball will raise and relieve the pressure so that the pressure will not at any time reach a dangerous value. The top member 50 and pan 48 cooperate to form a hollow cover which is filled with a low heat absorbing insulating material 58 as used in the construction of the well structure.

The deep well arrangement is advantageous in that it enables a thermostatic control as generally indicated at 59 in Figure 3 to be mounted in the wall of the well structure so as to automatically regulate the temperature within the well.

Referring to Figures 4 and 5, the thermostatic mechanism comprises a cylindrical member 60 which is provided at its inner end with an abutting flange 61 for engagement with the inner lining 16. The other end of the cylindrical member 60 is shaped to define a bearing for a shaft 62 which extends axially into the cylindrical member and has secured thereto one end of a surrounding coiled strip of thermostatic material 63. The other end of the thermostatic strip is secured to the cylindrical member 60. Mounted on the shaft 62 for movement therewith is an arm 64 of insulating material. This arm carries a pair of bridging contacts 65 and 66 which are respectively arranged to electrically interconnect a pair of spaced segments. The contact 65 bridges segments 67 and 68 and the contact 66 bridges segments 69 and 70. It will be observed that the segments 67 and 68 extend through a larger angle than the segments 69 and 70, whereby as the arm 64 is rotated in response to the expansion and contraction of the coil of thermostatic metal, the segments 67 and 68 will be connected after the connection between the segments 69 and 70 is broken. Each set of segments is mounted upon an insulating spacer 71 which is supported on the exterior of the pan 12.

Referring to Figure 4 the electrical connections through the thermostatic control means are as follows: the lead 29 is connected to the inner ends of the two heating elements 20. The outer end of one of the heating elements is connected through conductor 72 to the segment 68, and the outer end of the other heating element 20 is connected through a conductor 73 to segment 70. The leads 40 and 41 are respectively connected to segments 67 and 69.

The thermostatic control just described when connected as shown in Figure 4 will disconnect one of the heating elements before the other is disconnected, if the temperature is increased to more than desired, and will connect the disconnected element back into the circuit when the temperature falls lower than desired. For example, let it be assumed that the proper temperature of cut off of one of the heating elements is 210° F. The other heating element will continue to maintain sufficient heat for the cooking operation and use only half of the total current which would be consumed if both heating elements were operating. In the majority of cases the low heat supplied by a single heating element will be more than sufficient to continue the cooking operation, so the thermostat will cut off the remaining heating element when a temperature of substantially 220° F. is reached. As the temperature of the well cools down to 210° F., the thermostat will cut in the heating element which was lastly disconnected and the cooking operation will continue.

From the foregoing description, it will be apparent that this invention provides a well type heating element assembly of novel construction which is more efficient than the present types of surface heating element assemblies; which embodies a structure having low heat absorbing characteristics as compared to high heat absorbing characteristics in a fireless cooker, thereby preventing loss of heat energy through radiation and conduction; a heating element assembly having a structure which is adapted for use with a shallow well unit as well as a deep well unit; which is especially adapted for pressure cooking; and in which the terminals are mounted in such a manner as to prevent their becoming heated during the operation of the heating unit.

Now, it is of course to be understood that although I have described in detail the preferred embodiment of my invention, the invention is not to be thus limited but only insofar as defined by the scope and spirit of the appended claims.

I claim as my invention:

1. A heating element assembly comprising a container adapted to be supported from a cooking table top and having an integral outer wall and bottom, a bottom covering in said container of low heat absorbing material extending to the wall of the container, a heating element supported on said covering, an inwardly spaced lining for the container extending from the bottom covering to the top of the container, an insulating medium of low heat absorbing characteristics disposed between the container and said lining, a terminal block outside the container, said block being supported from the container, terminals supported by said block, and connections from said terminals to the heating element.

2. A heating element assembly comprising a container adapted to be supported from a cooking table top and having an integral wall and bottom, a bottom covering in the container of low heat absorbing material, an exposed heating element at the upper surface of the bottom covering, a terminal block on the bottom outside the container, a rod spaced above the heating element to support a cooking utensil, the ends of said rod extending through the terminal block which is thereby supported.

3. A heating element assembly comprising a container adapted to be supported from a cooking table top and having an integral wall and bottom, a bottom covering in the container of low heat absorbing material, and exposed heating element at the upper surface of the bottom covering, a terminal block on the bottom outside the container, a rod spaced above the heating element to support a cooking utensil having downwardly deflected end portions extending through the bottom, bottom covering and terminal block, said rod having a shoulder to abut the bottom, and nuts engaging the ends of said rods.

4. A heating element assembly comprising a container adapted to be supported from a cooking table top and having an integral wall and bottom, a bottom covering in the container of low heat absorbing material, an exposed heating element at the upper surface of the bottom covering, a terminal block on the bottom outside the container, a rod spaced above the heating element to support a cooking utensil having downwardly deflected end portions extending through the bottom, bottom covering and terminal block, said rod having a shoulder to abut the bottom, nuts engaging the ends of said rod, and a second rod extending transversely of said first rod, the second rod passing under said first rod and having deflected ends extending through the bottom covering and in abutment with said bottom, whereby the first rod secures the second rod against removal.

5. A heating element assembly comprising a container adapted to be supported from a cooking table top and having an integral outer wall and bottom, a bottom covering in said container of low heat absorbing material extending to the wall of the container, a heating element supported on said covering, an inwardly spaced lining for the container extending from the bottom covering to the top of the container, said inner lining being substantially less in thickness than the wall and bottom of the container, an insulating medium of low heat absorbing characteristics disposed between said wall and said lining, a terminal block outside the container, said block being supported on the container, terminals supported by said block, and connections from said terminals to the heating element.

GEORGE R. BLAKESLEY.